US011348170B2

(12) United States Patent
Ramirez et al.

(10) Patent No.: US 11,348,170 B2
(45) Date of Patent: May 31, 2022

(54) SYSTEMS AND METHODS FOR IDENTIFYING AND TRANSFERRING DIGITAL ASSETS

(71) Applicant: Allstate Insurance Company, Northbrook, IL (US)

(72) Inventors: Philip Peter Ramirez, Arlington Heights, IL (US); Kevin Mitchell, Chicago, IL (US); Christopher Liow, Northbrook, IL (US); Daniel Turcza, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 16/365,290

(22) Filed: Mar. 26, 2019

(65) Prior Publication Data
US 2019/0304012 A1 Oct. 3, 2019

Related U.S. Application Data (60) Provisional application No. 62/648,712, filed on Mar. 27, 2018.

(51) Int. Cl.
*G06Q 20/40* (2012.01)
*G06Q 40/02* (2012.01)
*G06Q 50/18* (2012.01)

(52) U.S. Cl.
CPC ......... *G06Q 40/02* (2013.01); *G06Q 20/4014* (2013.01); *G06Q 50/186* (2013.01)

(58) Field of Classification Search
CPC .............. G06Q 40/02; G06Q 20/4014; G06Q 50/186
See application file for complete search history.

(56) References Cited

U.S. PATENT DOCUMENTS

| 6,006,333 | A  | 12/1999 | Nielsen |
| D426,206 | S  | 6/2000  | Richter |
| D434,419 | S  | 11/2000 | Bomze et al. |
| 6,233,563 | B1 | 5/2001  | Jefferson et al. |
| 6,298,229 | B1 | 10/2001 | Tomlinson, Jr. et al. |
| D453,767 | S  | 2/2002  | Istvan et al. |
| 6,430,542 | B1 | 6/2002  | Moran |

(Continued)

FOREIGN PATENT DOCUMENTS

| CN | 101252627 A  | 8/2008 |
| CN | 107239967 A  | 10/2017 |
| EP | 1320004 A1   | 6/2003 |

OTHER PUBLICATIONS

Allstate Motor Club Launches Roadside Assistance Mobile App for iPhone and BlackBerry Users, Oct. 27, 2009; http://money.cnn.com/news/newsfeeds/articles/prnewswire/2009102711, 2 pages.

(Continued)

*Primary Examiner* — Mike Anderson
*Assistant Examiner* — Matthew Cobb
(74) *Attorney, Agent, or Firm* — Brooks Kushman P.C.

(57) ABSTRACT

Systems and methods in accordance with arrangements described herein can include identifying a variety of accounts associated with a user and determining a set of actions that can be taken with respect to the accounts. For instance, upon death of a user, a predetermined set of actions can be executed to transfer one or more assets as defined in a digital will. The accounts can be identified by scanning one or more accounts associated with the user. The accounts associated with the user and/or the account actions for the accounts can be automatically maintained over time. On an account transfer event, each of the accounts can be automatically transferred and/or closed in accordance with the determined account actions. In many embodiments, a password manager is maintained to facilitate the review of (Continued)

accounts and the performance of the appropriate actions on the occurrence of a transfer event.

16 Claims, 6 Drawing Sheets

(56) References Cited

U.S. PATENT DOCUMENTS

| | | |
|---|---|---|
| 6,415,226 B1 | 7/2002 | Kozak |
| D464,660 S | 10/2002 | Weng et al. |
| 6,493,629 B1 | 12/2002 | Van Bosch |
| 6,522,265 B1 | 2/2003 | Hillman et al. |
| D474,479 S | 5/2003 | Tambata |
| D474,780 S | 5/2003 | Tambata |
| D475,719 S | 6/2003 | Horie |
| 6,677,854 B2 | 1/2004 | Dix |
| 6,726,107 B1 | 4/2004 | Ruth |
| 6,745,153 B2 | 6/2004 | White et al. |
| D495,338 S | 8/2004 | Peter et al. |
| 6,771,742 B2 | 8/2004 | McCalmont et al. |
| 6,847,825 B1 | 1/2005 | Duvall et al. |
| D517,087 S | 3/2006 | Sands |
| 7,012,993 B2 | 3/2006 | Alton |
| 7,024,205 B1 | 4/2006 | Hose |
| 7,027,808 B2 | 4/2006 | Wesby |
| D522,015 S | 5/2006 | Cummins et al. |
| D523,442 S | 6/2006 | Hiramatsu |
| 7,068,994 B2 | 6/2006 | Van Camp |
| 7,091,903 B2 | 8/2006 | Kim |
| 7,092,695 B1 | 8/2006 | Boling et al. |
| 7,099,835 B2 | 8/2006 | Williams, III |
| D529,507 S | 10/2006 | Cummins |
| D529,510 S | 10/2006 | Cummins et al. |
| 7,119,669 B2 | 10/2006 | Lundsgaard et al. |
| 7,130,406 B2 | 10/2006 | Pines et al. |
| 7,142,959 B2 | 11/2006 | Oesterling et al. |
| 7,155,335 B2 | 12/2006 | Rennels |
| 7,167,796 B2 | 1/2007 | Taylor et al. |
| 7,174,243 B1 | 2/2007 | Lightner et al. |
| 7,215,965 B2 | 5/2007 | Fournier et al. |
| D544,871 S | 6/2007 | Lim et al. |
| 7,236,576 B2 | 6/2007 | Schnarel et al. |
| 7,242,966 B1 | 7/2007 | Averkamp |
| D550,689 S | 9/2007 | Vigesaa |
| 7,266,435 B2 | 9/2007 | Wang et al. |
| D553,146 S | 10/2007 | Byeon et al. |
| 7,289,786 B2 | 10/2007 | Krasner |
| D556,770 S | 12/2007 | O'Donnell et al. |
| D560,226 S | 1/2008 | Jung et al. |
| 7,323,973 B1 | 1/2008 | Ceglia et al. |
| D561,191 S | 2/2008 | Haning et al. |
| 7,336,172 B2 | 2/2008 | Govindaraj |
| D563,975 S | 3/2008 | Vigesaa |
| D564,541 S | 3/2008 | Lettau et al. |
| 7,343,565 B2 | 3/2008 | Ying et al. |
| D565,581 S | 4/2008 | Gunn et al. |
| 7,389,244 B2 | 6/2008 | Kaplan |
| 7,405,537 B2 | 7/2008 | Hoffman et al. |
| D574,842 S | 8/2008 | Kwag et al. |
| D575,302 S | 8/2008 | Millar et al. |
| 7,421,321 B2 | 9/2008 | Breed et al. |
| D578,134 S | 10/2008 | Jasinski |
| D579,946 S | 11/2008 | Lee et al. |
| 7,457,693 B2 | 11/2008 | Olsen et al. |
| 7,460,019 B2 | 12/2008 | Henderson |
| 7,463,951 B2 | 12/2008 | Ampunan et al. |
| 7,480,546 B2 | 1/2009 | Kamdar et al. |
| D586,355 S | 2/2009 | Mori et al. |
| 7,487,111 B2 | 2/2009 | Shoen et al. |
| 7,499,714 B2 | 3/2009 | Ki |
| D592,223 S | 5/2009 | Neuhaus |
| D593,110 S | 5/2009 | Danton |
| D593,111 S | 5/2009 | Danton |
| D594,465 S | 6/2009 | Hong et al. |
| D594,468 S | 6/2009 | Bamford et al. |
| 7,593,855 B1 | 9/2009 | Craig |
| 7,602,388 B2 | 10/2009 | Plut |
| D605,657 S | 12/2009 | Danton |
| D607,464 S | 1/2010 | Tang et al. |
| D608,366 S | 1/2010 | Matas |
| D611,056 S | 3/2010 | Langlois et al. |
| D618,249 S | 6/2010 | Ahn et al. |
| D618,696 S | 6/2010 | Woods et al. |
| D618,700 S | 6/2010 | Song |
| D618,702 S | 6/2010 | Lee |
| D621,849 S | 8/2010 | Anzures et al. |
| 7,777,648 B2 | 8/2010 | Smith et al. |
| D623,555 S | 9/2010 | Reithlingshoefer et al. |
| D624,556 S | 9/2010 | Chaudhri |
| D624,589 S | 9/2010 | Robbins |
| 7,802,722 B1 | 9/2010 | Papiemiak et al. |
| D625,312 S | 10/2010 | Jewitt et al. |
| 7,813,980 B2 | 10/2010 | Crockett |
| D631,889 S | 2/2011 | Vance et al. |
| D642,194 S | 7/2011 | Kozlowski et al. |
| D645,051 S | 9/2011 | Kozlowski et al. |
| 8,140,358 B1 | 3/2012 | Ling et al. |
| 8,166,026 B1 | 4/2012 | Sadler |
| 8,285,571 B2 | 10/2012 | Demirdjian et al. |
| 8,289,171 B2 | 10/2012 | Morley |
| 8,315,792 B2 | 11/2012 | Speier et al. |
| 8,375,032 B2 | 2/2013 | Birdwell et al. |
| 8,606,512 B1 | 12/2013 | Bogovich et al. |
| 8,645,014 B1 | 2/2014 | Kozlowski et al. |
| 8,738,422 B2 | 5/2014 | Lerner et al. |
| 8,750,902 B2 | 6/2014 | Xiao et al. |
| 8,781,657 B2 | 7/2014 | Pebbles |
| 8,799,034 B1 | 8/2014 | Brandmaier et al. |
| 8,805,603 B1 | 8/2014 | Cavallaro Kozlowski et al. |
| 8,805,707 B2 | 8/2014 | Schumann, Jr. et al. |
| 8,959,156 B2 | 2/2015 | Polis et al. |
| 9,297,723 B1 | 3/2016 | Hofmann et al. |
| 9,384,491 B1 | 7/2016 | Briggs et al. |
| 9,406,228 B1 | 8/2016 | Kozlowski et al. |
| 9,411,982 B1 | 8/2016 | Dippenaar et al. |
| 9,412,130 B2 | 8/2016 | Wasserman et al. |
| 9,497,585 B1 | 11/2016 | Cooley et al. |
| 9,659,301 B1 | 5/2017 | Briggs et al. |
| 9,674,156 B2 | 6/2017 | Stiglic et al. |
| 9,684,924 B2 | 6/2017 | Wasserman et al. |
| 9,692,815 B2 | 6/2017 | Caldwell |
| 9,697,525 B1 | 7/2017 | Kozlowski et al. |
| 9,881,268 B1 | 1/2018 | Briggs et al. |
| 10,186,134 B1 | 1/2019 | Moon et al. |
| 2002/0055861 A1 | 5/2002 | King et al. |
| 2002/0065703 A1 | 5/2002 | Garg |
| 2002/0073012 A1 | 6/2002 | Lowell et al. |
| 2002/0096561 A1 | 7/2002 | Sullivan |
| 2002/0184653 A1 | 12/2002 | Pierce et al. |
| 2003/0088347 A1 | 5/2003 | Ames |
| 2003/0182290 A1* | 9/2003 | Parker .................. G06Q 40/02 |
| 2004/0024711 A1 | 2/2004 | Camping et al. |
| 2004/0100363 A1 | 5/2004 | Lane et al. |
| 2004/0100479 A1 | 5/2004 | Nakano et al. |
| 2004/0111195 A1 | 6/2004 | Vries et al. |
| 2004/0192336 A1 | 9/2004 | Walby |
| 2004/0203850 A1 | 10/2004 | Oesterling |
| 2004/0221239 A1 | 11/2004 | Hachigian et al. |
| 2005/0027438 A1 | 2/2005 | Rockett et al. |
| 2005/0071052 A1 | 3/2005 | Coletrane et al. |
| 2005/0091272 A1 | 4/2005 | Smith et al. |
| 2005/0144114 A1 | 6/2005 | Ruggieri et al. |
| 2005/0187833 A1 | 8/2005 | Royer et al. |
| 2005/0197771 A1 | 9/2005 | Seick et al. |
| 2005/0261986 A1 | 11/2005 | Haynes et al. |
| 2006/0022846 A1 | 2/2006 | Tummala |
| 2006/0123360 A1 | 6/2006 | Anwar et al. |
| 2006/0245570 A1 | 11/2006 | Pfleging et al. |
| 2006/0247852 A1 | 11/2006 | Kortge et al. |
| 2006/0291633 A1 | 12/2006 | Glaza et al. |
| 2007/0011278 A1 | 1/2007 | Nou |
| 2007/0033540 A1 | 2/2007 | Bridges et al. |
| 2007/0043770 A1 | 2/2007 | Goodrich et al. |

(56) References Cited

U.S. PATENT DOCUMENTS

| | | |
|---|---|---|
| 2007/0061270 A1* | 3/2007 | Seto .................. G06Q 40/00 705/64 |
| 2007/0066276 A1 | 3/2007 | Kuz et al. |
| 2007/0072625 A1 | 3/2007 | Fournier et al. |
| 2007/0088473 A1 | 4/2007 | Moon et al. |
| 2007/0122026 A1 | 5/2007 | Ersue et al. |
| 2007/0135990 A1 | 6/2007 | Seymour et al. |
| 2007/0139182 A1 | 6/2007 | O'Connor et al. |
| 2007/0142026 A1 | 6/2007 | Kuz et al. |
| 2007/0167147 A1 | 7/2007 | Krasner et al. |
| 2007/0185728 A1 | 8/2007 | Schwarz et al. |
| 2007/0226783 A1 | 9/2007 | Mimlitsch |
| 2007/0240079 A1 | 10/2007 | Flynt et al. |
| 2007/0244628 A1 | 10/2007 | Rockett et al. |
| 2007/0252689 A1 | 11/2007 | Rothschild |
| 2007/0298765 A1 | 12/2007 | Dickinson et al. |
| 2008/0004790 A1 | 1/2008 | Ames |
| 2008/0014908 A1 | 1/2008 | Vasant |
| 2008/0054072 A1 | 3/2008 | Katragadda et al. |
| 2008/0119203 A1 | 5/2008 | Shalmon et al. |
| 2008/0140287 A1 | 6/2008 | Yang et al. |
| 2008/0167937 A1 | 7/2008 | Coughlin et al. |
| 2008/0177653 A1 | 7/2008 | Famolari et al. |
| 2008/0215240 A1 | 9/2008 | Howard et al. |
| 2008/0261554 A1 | 10/2008 | Keller et al. |
| 2008/0306982 A1 | 12/2008 | Moudy |
| 2008/0319665 A1 | 12/2008 | Berkobin et al. |
| 2009/0002145 A1 | 1/2009 | Berry et al. |
| 2009/0037426 A1* | 2/2009 | Haviland, Jr. ......... G06Q 10/10 |
| 2009/0072995 A1 | 3/2009 | Thomas et al. |
| 2009/0088967 A1 | 4/2009 | Lerner et al. |
| 2009/0093236 A1 | 4/2009 | Balan et al. |
| 2009/0125178 A1 | 5/2009 | Wilson |
| 2009/0210142 A1 | 8/2009 | Couckuyt et al. |
| 2009/0216600 A1 | 8/2009 | Hill |
| 2009/0233572 A1 | 9/2009 | Basir |
| 2009/0287527 A1 | 11/2009 | Kolb et al. |
| 2010/0070487 A1 | 3/2010 | Fetsch |
| 2010/0138242 A1 | 6/2010 | Ferrick et al. |
| 2010/0161382 A1 | 6/2010 | Cole |
| 2010/0207787 A1 | 8/2010 | Catten et al. |
| 2010/0332133 A1 | 12/2010 | Harris et al. |
| 2011/0082816 A1 | 4/2011 | Moffett |
| 2011/0213628 A1 | 9/2011 | Peak et al. |
| 2011/0238999 A1 | 9/2011 | Lee et al. |
| 2012/0136743 A1 | 5/2012 | McQuade et al. |
| 2012/0179363 A1 | 7/2012 | Pierfelice |
| 2013/0183924 A1 | 7/2013 | Saigh et al. |
| 2014/0222618 A1 | 8/2014 | Stamp et al. |
| 2014/0358943 A1 | 12/2014 | Raymond et al. |
| 2015/0012303 A1 | 1/2015 | Ghosh |
| 2015/0026088 A1 | 1/2015 | Alber et al. |
| 2015/0161867 A1 | 6/2015 | Bell et al. |
| 2015/0207786 A1 | 7/2015 | Pitroda |
| 2015/0242814 A1* | 8/2015 | Saad .................... G06Q 50/186 705/312 |
| 2015/0317638 A1* | 11/2015 | Donaldson ....... G06Q 20/40145 705/44 |
| 2015/0326548 A1* | 11/2015 | Marson ................. H04L 63/102 726/4 |
| 2016/0048934 A1 | 2/2016 | Gross |
| 2016/0140299 A1 | 5/2016 | Al Harbi |
| 2016/0155201 A9 | 6/2016 | Bell |
| 2016/0232598 A1 | 8/2016 | Wasserman et al. |
| 2016/0260187 A1* | 9/2016 | Rajagopalan .......... G06Q 40/06 |
| 2016/0337394 A1* | 11/2016 | Crowley ............. H04L 63/1441 |
| 2017/0011465 A1 | 1/2017 | Anastassov et al. |
| 2017/0249702 A1 | 8/2017 | Wasserman et al. |
| 2017/0301048 A1* | 10/2017 | Turek .................... G06Q 10/10 |
| 2018/0073879 A1 | 3/2018 | Hakeem et al. |
| 2018/0082391 A1* | 3/2018 | Brody ................. G06Q 50/186 |
| 2018/0189147 A1 | 7/2018 | Banasik et al. |
| 2018/0189913 A1 | 7/2018 | Knopp et al. |
| 2018/0218446 A1 | 8/2018 | Ries et al. |
| 2019/0156655 A1 | 5/2019 | Cordes et al. |
| 2019/0304012 A1* | 10/2019 | Ramirez .............. G06Q 50/186 |

OTHER PUBLICATIONS

TMC News, ATX Launches Enhanced Automatic Collision Notification for BMW, Jan. 11, 2009, http://tmcnet.com/usubmit/2009/01/11/3905139.htm, 4 pages.

Automotive Fleet, Aug. 2009, vol. 48, No. 9, Charging for Preventable Accidents: What's the Payoff?, Grace Lauron, 4 pages.

Automotive Fleet, May 2009, Bright Ideas Energize Fleet Management, Cindy Brauer and Thi Dao, 5 pages.

Automotive Fleet, Sep. 2009 vol. 48 No. 10, DWT Proven to Increase Accidents, Grace Lauron, 5 pages.

Motorola Demonstrates New Communications System Available in BMW's Global 2005 Model Year Vehicle Line, http://www.virtualizationconference.com/49572/print, 2 pages, retrieved on Feb. 6, 2009.

BMW Assist, Safety & Convenience Services © 2006 BMW of North America, LLC, 16 pages.

Automotive Fleet, Emkay Partners With Networkcar to Launch New Networkfleet Telematics Solution, Apr. 29, 2008, © 2009 Automotive Fleet, 1 page.

Geotab Management by Measurement, Geotab for Insurance Companies © 2008, 1 page.

CIO, High-tech Cars: The Coolest Automotive Technologies, Denise Dubie, Network World, Oct. 5, 2008, http://www.cio.com/article/print/452913, retrieved on Feb. 6, 2009, 2 pages.

Inrix News, Inrix Real-Time Traffic Now Available on Over 75 Navigation and Mobile Devices, Jul. 30, 2007, http://www.inrix.com/news_75Devices_30July2007.asp, retrieved Feb. 6, 2009, 1 page.

ABIresearch, Wireless Connectivity to the Automobile Is Hindered by Lack of Standards and Interoperability, Jul. 31, 2007, http://www.abiresearch.com/abiprdisplay.jsp?pressid=894, retrieved on Feb. 6, 2009, 1 page.

When Accidents Happen, Nationwide Mobile App for IPhone is on Your Side, Melanie Broemsen, May 10, 2009, http://www.articlesbase.com/print/909297, retrieved on Jun. 23, 2009, 1 page.

Diagnostic Trouble Codes (DTCs) Powertrain Codes for OBD II (OBD-2) equipped GM vehicles, compiled by Anthony W. Haukap; http://myweb.accessus.net/~090/dtocbd2p.html; retrieved on Jul. 20, 2009, 20 pages.

Automotive Fleet, OnStar Receives Honors at Telematics Update Awards © 2009 Automotive Fleet, http://www.automotive-fleet.com/News/Print/Story/2008/05/OnStar Receives, retrieved on Feb. 6, 2009, 1 page.

Real time traffic broadcast to debut in Australia, http://www.gpsbusinessnews.com, retrieved Feb. 6, 2009 1 page.

ABIresearch, In-Vehicle Infotainment Storage and Networking, Hard Disks, Flash Memory, USB, SD, Bluetooth, UWB, iPod Kits and Other Technologies, http://www.abiresearch.com/producs/market_research/In-Vehicle_Infotainment, retrieved on Feb. 6, 2009, 2 pages.

TechWorld, Pimp your ride: Cool car technology, Denise Dubie (Network World) Jul. 10, 2008; http://www.techworld.com/au/article/262977/pimp_your_ride_cool_car, retrieved on Feb. 6, 2009, 3 pages.

Maya Software Technologies, White Paper, Automotive Telematics—Market Overview and Security Considerations © 2001, 12 pages.

Intomobile, Volkswagen Launches iPhone Optimized Website Featuring Access to Emergency Roadside Assistance, http://www.intomobile.com/2009/03/30/volkswagen-launches-iPhone-optimized-website-featuring-access, retrieved on Jun. 23, 2009, 3 pages.

RepairPal for iPhone, http://repairpal.com/mobile, retrieved Feb. 2, 2009, 13 pages.

TradeVibes, The RepairPal iPhone App is Available! © 2007-2008 Mill River Labs, www.tradevibes.com/news/view/repairpal?article=86228, retrieved on Feb. 2, 2009, 1 page.

(56) References Cited

OTHER PUBLICATIONS

Übergizm™, RepairPal: Roadside Assistance from the iPhone, posted Jan. 22, 2009, http://www.ubergizmo.com/15/archives/2009/01/repairpal_roadside_assistance, retrieved on Feb. 2, 2009, 1 page.
Automotive Fleet, Sep. 2009 vol. 48 No. 10, 10 Recommendations: What Drivers Should Do After a Fleet Accident, Mike Antich, 4 pages.
Automotive Fleet/2009 NAFA Planning Guide, NAFA 2009 Institute & Expo Advanced Planning Guide, 2 pages.
U.S. Appl. No. 29/396,366, filed Jun. 29, 2011.
U.S. Copyright Registration No. TX 7-150-082, "Mini Road Assist", registered on Mar. 19, 2010.
U.S. Copyright Registration No. TX 7-329-434, "Mini Road Assist", registered on Mar. 19, 2010.
U.S. Copyright Registration No. TX 7-150-080, "Mini Road Assist", registered Mar. 29, 2010.
U.S. Copyright Registration No. TX 7-195-526, "Allstate Motor Club Roadside Assistance", registered Mar. 30, 2010.
U.S. Copyright Registration No. TX 7-229-997, "Allstate Motor Club Roadside Assistance", registered Mar. 19, 2010.
U.S. Copyright Registration No. TX 7-150-076, "Allstate Motor Club Roadside Assistance", registered Mar. 26, 2010.
"Roadside Assistance with Emergency Roadside Service", http://www.geico.com/getaquote/auto/emergency-road-service/, downloaded Feb. 25, 2015, pp. 1-5.
BoatUS Towing App—Free for All Boaters—BoatUS, http://www.boatus.com/towing/app.asp, downloaded Feb. 25, 2015, pp. 1-2.
Software Engineering for Service-Oriented Overlay Computers, D1.4a: UML for Service-Oriented Systems, Sensoria, Oct. 10, 2007, pp. 1-21.
Lapadula, A., COWS Specification of the On Road Assistance Scenario, Dec. 19, 2007, pp. 1-9.
Mar. 17, 2016—(WO) International Search Report and Written Opinion—App PCT/US16/14044.
Jun. 22, 2018—(EP) Supplementary European Search Report—EP16746952.
Anonymous: "On-Board Diagnostics—Wikipedia", Jan. 29, 2015, XP055478209.
The Sweet Setup, How to use 1Password as a digital will, https://thesweetsetup.com/1password-digital-will, Aug. 15, 2018, 8 pages.
Mylennium, Digital Asset Toolbox, https://www.mylennium.com/digital-asset-toolbox, Jan. 21, 2019, 4 pages.
Deseat.me, Clean up your online presence, https://www.deseat.me, Jan. 21, 2019, 5 pages.
Kiplinger, Protect Digital Assets After Your Death, https://www.kiplinger.com/article/retirement/T021-C000-S004-protect-digital-assets-after-your-death.html, Jan. 21, 2019, 5 pages.
AfterVault, The Digital Beyond, http://www.thedigitalbeyond.com/online-services-list/aftervault, Jan. 21, 2019, 3 pages.
Yodlee, Account Aggregation Software: What it Is and How to Choose It, https://www.yodlee.com/trending/content/account-aggregation-software-what-it-and-how-choose-it, Jan. 21, 2019, 8 pages.
Ernie Feirer "Strategic Visualization: Evolving How You View Commercial Property Insurance Underwriting" LexisNexis website: https://www.lexisnexis.com/risk/downloads/assets/strategic-visualization-wp.pdf Sep. 2015, pp. 1-6.
"Underwriting and Rating Integrity" Verisk Analytics, Inc. website: https://www.verisk.com/insurance/capabilities/underwriting/property/underwriting-and-rating-integrity/ visited Dec. 20, 2018, pp. 1-7.
Xinrong Li "Catastrophe Model Suitability Analysis: Quantitative Scoring" Cass Business School City University London website: https://www.scor.com/fr/files/actuarial-award-2014-uk-catastrophe-model-suitability-analysis-quantitative-scoring Aug. 2013, pp. 1-71.
"Expand your real estate investment horizons" Location Inc website: https://locationinc.com/industry-solutions/real-estate-data/ website visited Dec. 21, 2018, pp. 1-7.
Jennifer Nicole Dowling "Finding Your Best-Fit Neighborhood: A Web GIS Application For Online Residential Property Searches For Anchorage, Alaska" Thesis Presented to the Faculty of the USC Graduate School website: https://spatial.usc.edu/wp-content/uploads/2014/10/DowlingJennifer.pdf Dec. 2014, pp. 1-41.
Jul. 23, 2019—(WO) International Search Report and Written Opinion—PCT/US19/24202.
Jun. 14, 2019—(WO) International Search Report & Written Opinion—PCT/US19/024272.

* cited by examiner

SYSTEMS AND METHODS FOR IDENTIFYING AND TRANSFERRING DIGITAL ASSETS

CROSS-REFERENCE TO RELATED APPLICATIONS

This application claims priority to U.S. Provisional Patent Application No. 62/648,712, titled "Digital Will" and filed Mar. 27, 2018, the disclosure of which is hereby incorporated by reference in its entirety.

FIELD OF INVENTION

Aspects of the disclosure generally relate to methods and computer systems, including one or more computers particularly configured and/or executing computer software. More specifically, aspects of this disclosure relate to systems for identifying, categorizing, and managing online accounts.

BACKGROUND

Users today can have a large number of online accounts, many of which can have been long forgotten about. The accounts can be active and accessible online. Many accounts have a financial value and/or subscription fees to maintain the account.

A will is a legal document providing how property is to be distributed on occurrence of a particular condition or event, such as death, or set of conditions or events. The will can identify a set of beneficiaries that receive the property as described in the will. For example, the beneficiary of a piece of personal property is the person who receives the property after the death of the insured.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Systems and methods in accordance with arrangements described herein can include identifying a variety of accounts associated with a user and determining a set of actions that can be taken with respect to the accounts. For instance, upon death of a user, a predetermined set of actions can be executed to transfer one or more assets as defined in a digital will. In a variety of embodiments, the accounts can be identified by scanning one or more email accounts and/or social media accounts associated with the user. The accounts associated with the user and/or the account actions for the accounts can be automatically maintained over time. On an account transfer event, each of the accounts can be automatically transferred and/or closed in accordance with the determined account actions. In many embodiments, a password manager is maintained to facilitate the review of accounts and the performance of the appropriate actions on the occurrence of a transfer event.

The arrangements described can also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

In the following description of the various embodiments of the disclosure, reference is made to the accompanying drawings, which form a part hereof, and in which is shown by way of illustration, various embodiments in which the disclosure can be practiced. It is to be understood that other embodiments can be utilized and structural and functional modifications can be made.

Asset Management Systems

By monitoring and providing a user with a comprehensive listing of all of their subscriptions and accounts, asset management systems can assist a user in maintaining, transferring, and/or closing accounts.

Figure 1:
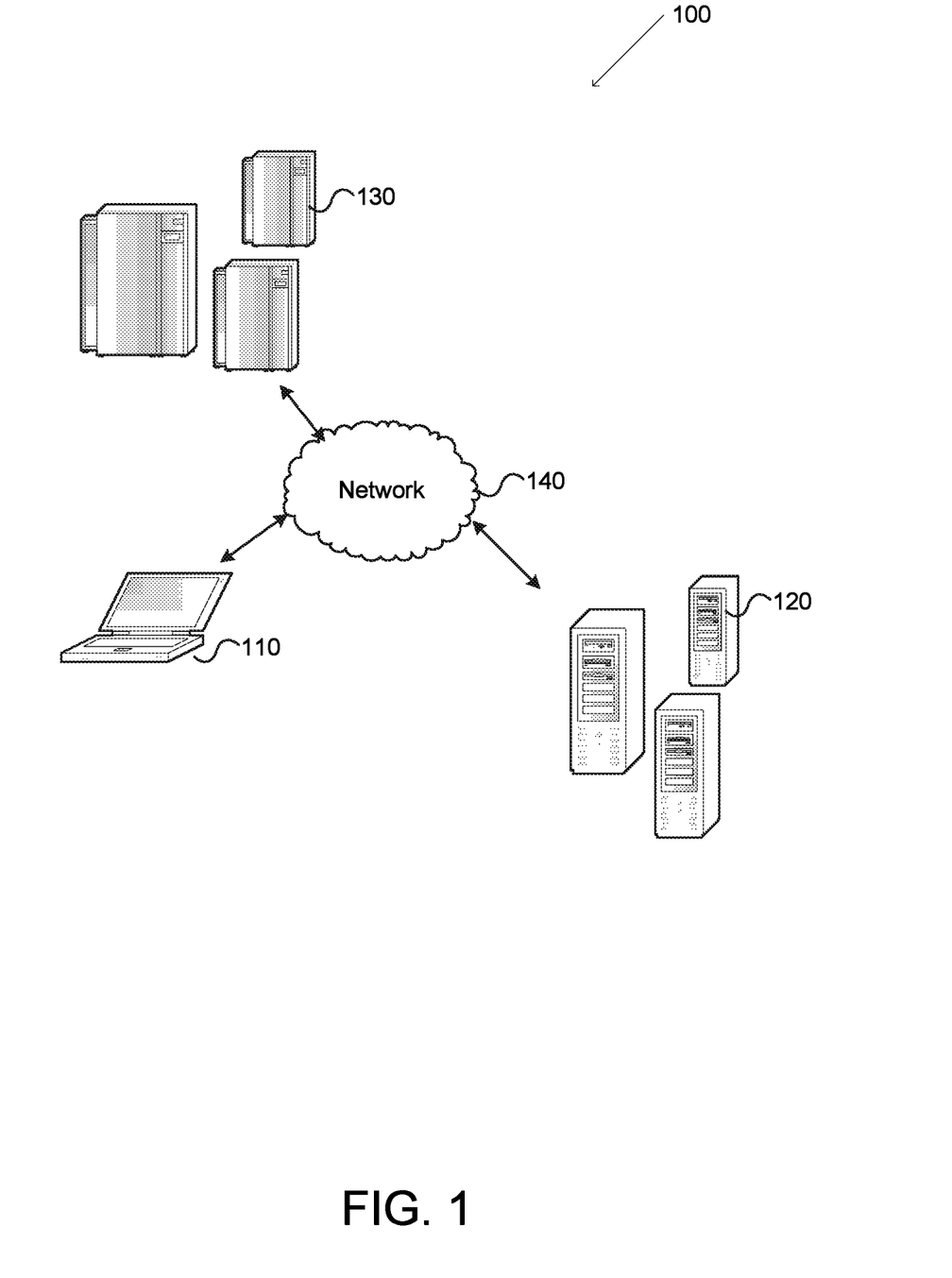
FIG. 1 illustrates an example operating environment in which one or more aspects described herein can be implemented.

FIG. 1 illustrates an asset management system 100 in accordance with arrangements described herein. The asset management system 100 includes at least one asset management device 110, at least one account system 120, and at least one asset management server system 130 in communication via a network 140. Any of the devices and systems described herein can be implemented, in whole or in part, using one or more computing devices described with respect to FIG. 2.

Asset management device 110 can allow users to automatically identify accounts, determine potential actions which can be performed with respect to those accounts, and effect the execution of those actions as described herein. Asset management device 110 can include a computing device, such as a personal computer, server, laptop computer, notebook, tablet, smartphone, and the like. Account systems 120 can provide any of a variety of accounts and/or other services. Account systems 120 can provide banking accounts, reward program accounts, loyalty accounts, frequent flyer accounts, streaming media accounts, social media accounts, e-mail accounts, digital currency wallets and/or other digital currency services, a digital currency ledger or any blockchain ledger, and the like. Asset management server systems 130 can obtain data from one or more account systems and automatically process the data to determine account actions for each account. Asset management server system 130 can also associate one or more transfer events with each account and automatically perform the transfer events on receipt of data indicating that a transfer event should be performed. Additionally, asset management server systems 130 can train and/or provide machine classifiers to perform any of the processes described herein. The network 140 can include a local area network (LAN), a wide area network (WAN), a wireless telecommunications network, and/or any other communication network or combination thereof. The asset management devices 110 and/or asset management server systems 130 can maintain a password manager for storing and providing usernames and/or passwords for a variety of accounts. In several embodiments, the password manager can be used to identify accounts associated with one or more account systems 120 and/or the status of the credentials associated with those accounts.

As discussed herein, the data transferred to and from various devices in an asset management system 100 can include secure and sensitive data, such as confidential information, account information, and/or recipients for transfer events. Confidential information can include identity information such as name or birth date, marital status, family members, education, employment histories, online identities (e.g., usernames on a social media or other account), financial information (e.g., bank account numbers, credit card numbers, etc.), traceable assets (e.g., real estate, vehicles, personal property, etc.), court records, and/or other such information. Therefore, it can be desirable to protect transmissions of such data using secure network protocols and encryption, and/or to protect the integrity of the data when stored on the various computing devices within the asset management system 100. For example, a file-based integration scheme or a service-based integration scheme can be utilized for transmitting data between the various computing devices. Data can be transmitted using various network communication protocols. Secure data transmission protocols and/or encryption can be used in file transfers to protect the integrity of the data, for example, File Transfer Protocol (FTP), Secure File Transfer Protocol (SFTP), and/or Pretty Good Privacy (PGP) encryption. In many embodiments, one or more web services can be implemented within the various computing devices. Web services can be accessed by authorized external devices and users to support input, extraction, and manipulation of data between the various computing devices in the asset management system 100. Web services built to support a personalized display system can be cross-domain and/or cross-platform, and can be built for enterprise use. Such web services can be developed in accordance with various web service standards, such as the Web Service Interoperability (WS-I) guidelines. Data can be transmitted using the Secure Sockets Layer (SSL) or Transport Layer Security (TLS) protocol to provide secure connections between the computing devices. Web services can be implemented using the WS-Security standard, which provides for secure SOAP messages using XML encryption. Specialized hardware can be used to provide secure web services. For example, secure network appliances can include built-in features such as hardware-accelerated SSL and HTTPS, WS-Security, and/or firewalls. Such specialized hardware can be installed and configured in the asset management system 100 in front of one or more computing devices such that any external devices can communicate directly with the specialized hardware.

It will be appreciated that the network connections shown are illustrative and other means of establishing a communications link between the computers can be used. The existence of any of various network protocols such as TCP/IP, Ethernet, FTP, HTTP and the like, and of various wireless communication technologies such as GSM, CDMA, WiFi, and WiMAX, is presumed, and the various computing devices described herein can be configured to communicate using any of these network protocols or technologies.

Computing Devices

Figure 2:
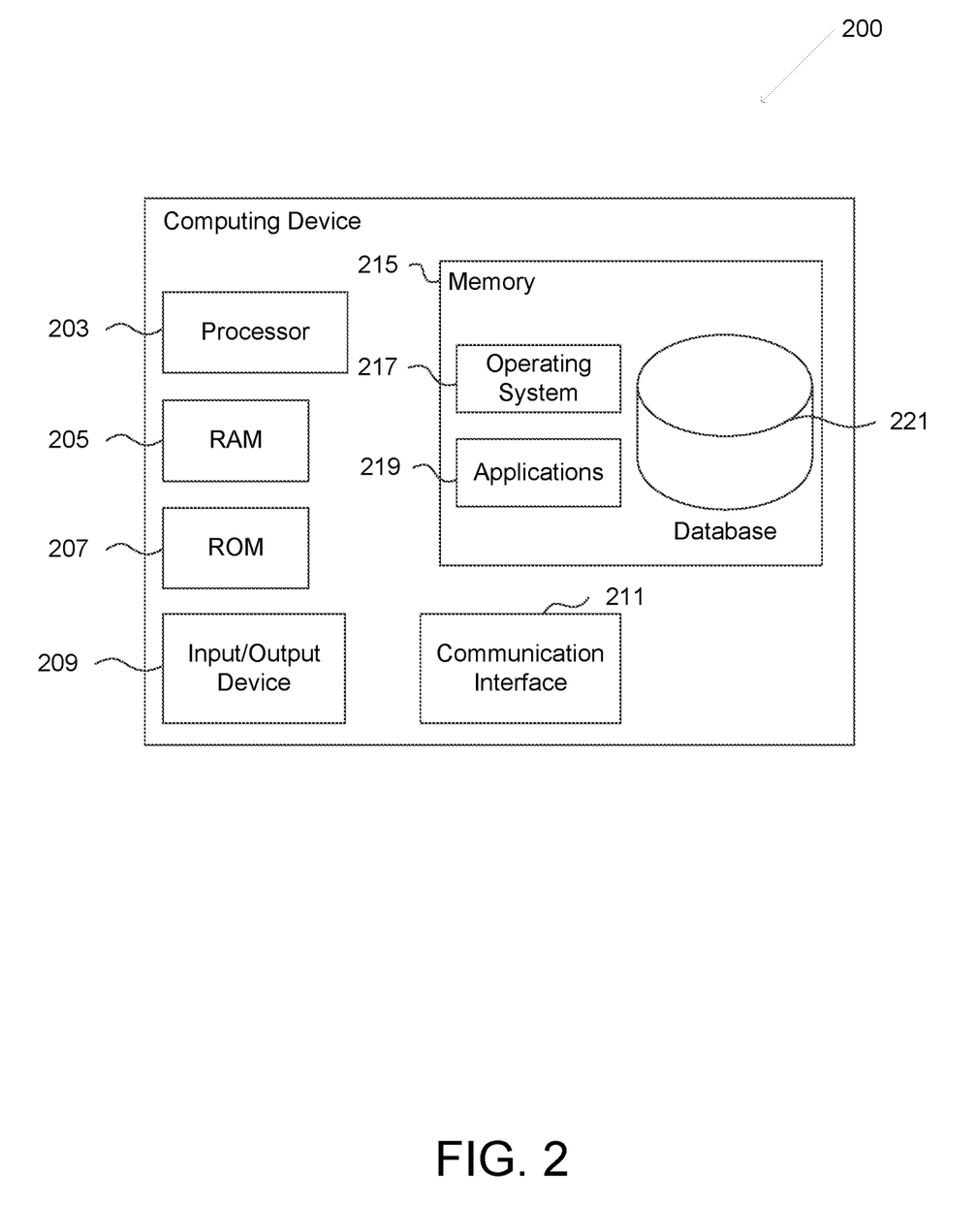
FIG. 2 illustrates one an example computing device in accordance with one or more aspects described herein.

Turning now to FIG. 2, a computing device 200 in accordance with one or more aspects described herein is shown. The computing device 200 can include a processor 203 for controlling overall operation of the computing device 200 and its associated components, including RAM 205, ROM 207, input/output device 209, communication interface 211, and/or memory 215. A data bus can interconnect processor(s) 203, RAM 205, ROM 207, memory 215, I/O device 209, and/or communication interface 211.

Input/output (I/O) device 209 can include a microphone, keypad, touch screen, and/or stylus through which a user of the computing device 200 can provide input, and can also include one or more of a speaker for providing audio output and a video display device for providing textual, audiovisual, and/or graphical output. Software can be stored within memory 215 to provide instructions to processor 203 allowing computing device 200 to perform various actions. For example, memory 215 can store software used by the computing device 200, such as an operating system 217, application programs 219, and/or an associated internal database 221. The various hardware memory units in memory 215 can include volatile and nonvolatile, removable and non-removable media implemented in any method or technology for storage of information such as computer-readable instructions, data structures, program modules, or other data. Memory 215 can include one or more physical persistent memory devices and/or one or more non-persistent memory devices. Memory 215 can include, but is not limited to, random access memory (RAM) 205, read only memory (ROM) 207, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 203.

Communication interface 211 can include one or more transceivers, digital signal processors, and/or additional circuitry and software for communicating via any network, wired or wireless, using any protocol as described herein.

Processor 203 can include a single central processing unit (CPU), which can be a single-core or multi-core processor (e.g., dual-core, quad-core, etc.), or can include multiple CPUs. Processor(s) 203 and associated components can allow the computing device 200 to execute a series of computer-readable instructions to perform some or all of the processes described herein. Although not shown in FIG. 2, various elements within memory 215 or other components in computing device 200, can include one or more caches, for example, CPU caches used by the processor 203, page caches used by the operating system 217, disk caches of a hard drive, and/or database caches used to cache content from database 221. For embodiments including a CPU cache, the CPU cache can be used by one or more processors 203 to reduce memory latency and access time. A processor 203 can retrieve data from or write data to the CPU cache rather than reading/writing to memory 215, which can improve the speed of these operations. In some examples, a database cache can be created in which certain data from a database 221 is cached in a separate smaller database in a memory separate from the database, such as in RAM 205 or on a separate computing device. For instance, in a multi-tiered application, a database cache on an application server can reduce data retrieval and data manipulation time by not needing to communicate over a network with a back-end database server. These types of caches and others can be included in various embodiments, and can provide potential advantages in certain implementations of document development systems, such as faster response times and less dependence on network conditions when transmitting and receiving data.

Although various components of computing device 200 are described separately, functionality of the various components can be combined and/or performed by a single component and/or multiple computing devices in communication without departing from the invention.

Transferring Digital Assets

Figure 3:
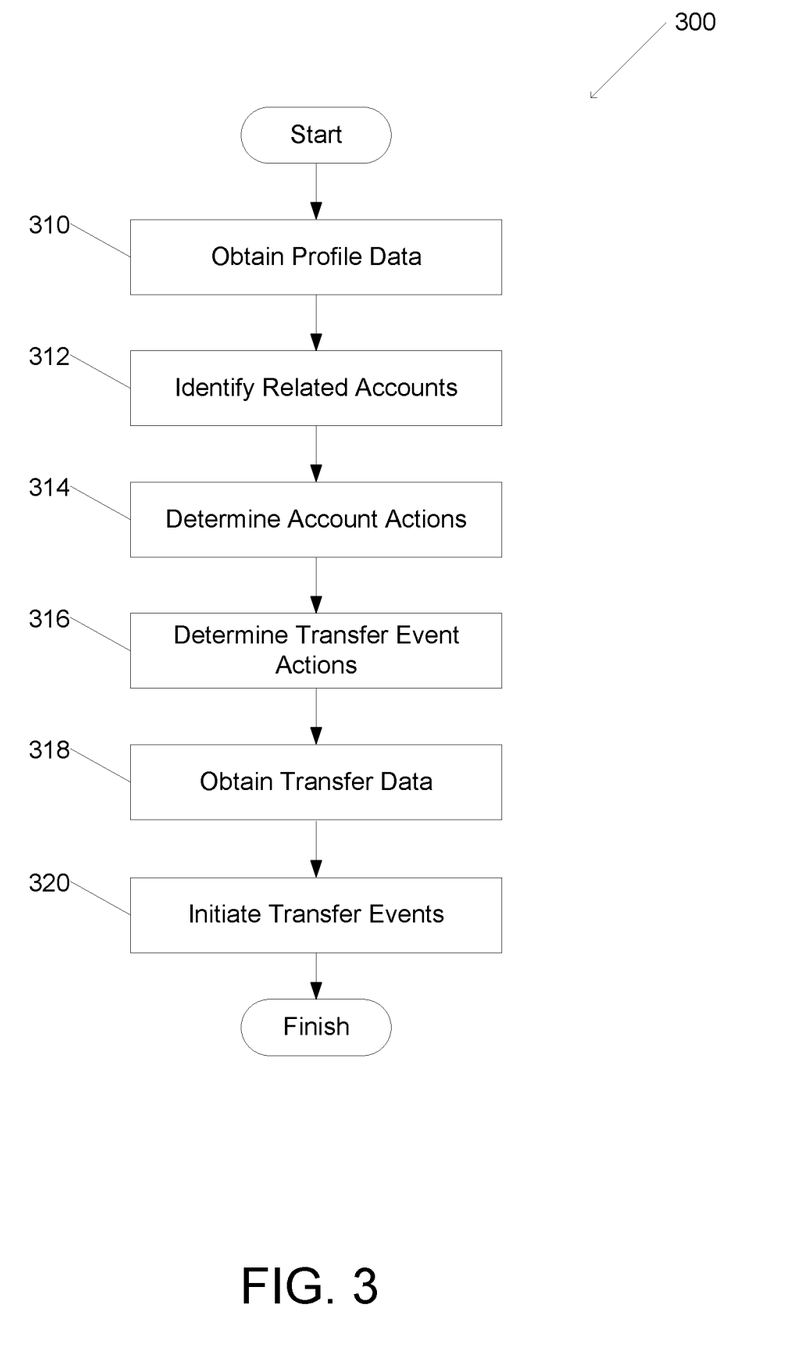
FIG. 3 is a flowchart illustrating a process for executing a transfer of digital assets in accordance with embodiments described herein.

Turning now to FIG. 3, a process for executing a transfer of digital assets in accordance with one or more aspects described herein is shown. Some or all of the steps of FIG. 3 can be performed by any computing device and/or combination thereof described herein. Some or all of the steps described with respect to FIG. 3, particularly those aspects directed to user data capture, transmission and/or use of personal data, and/or storage of login information, can be performed with permission of the user and/or designated beneficiary.

Process 300 can include obtaining (310) profile data. The profile data can include details of a user including but not limited to the user's name, age, address, driver's license number, credit card or bank information, insurance policies, digital currency wallet information, and/or the like. The user can manually provide the information and/or the information can be automatically determined by processing one or more accounts associated with the user as described in more detail herein. In a variety of embodiments, the profile data includes one or more email accounts and/or social media accounts associated with the user. The profile data can also include a listing of accounts associated with the user, account login information (e.g. usernames and passwords) for the accounts, master password information, two-factor authentication information, biometric data, transfer event data, and the like. In a number of embodiments, the profile data can be automatically updated to include additional information as additional related accounts are identified and/or change over time.

Related accounts can be identified (312). In several embodiments, one or more email accounts identified in the profile data can be automatically scanned to determine one or more related accounts. For example, a consumer can have thirty different accounts detected across a range of account systems (e.g., different types of accounts, accounts associated with different entities or organizations, accounts from different providers, and the like). The email accounts can be automatically monitored to automatically identify new related accounts. In many embodiments, one or more social media accounts identified in the profile data can be automatically scanned to determine one or more related accounts. In a variety of embodiments, a password manager can be analyzed to identify one or more account systems based on the password manager storing a username and password for the account system. The accounts can be categorized into various groups, such as financial accounts and subscriptions associated with the consumer. The categorized listings can assist a consumer in keeping track of their online accounts and/or designating multiple accounts for a particular transfer event. A variety of processes for identifying related accounts are described with respect to FIG. 4.

Account actions can be determined (314). A variety of account agreement data, such as the terms and conditions for each account, can be obtained. This data can be automatically processed to determine one or more actions that can be taken with respect to each account. Account actions can include, but are not limited to, transferring the account to a third party, closing the account, setting a beneficiary for an account, modifying the address associated with an account, redeeming rewards associated with an account, transferring data associated with an account, and the like. In a number of embodiments, more than one action can be designed for a particular account. In several embodiments, one or more account actions can be assigned to a group of accounts. In many embodiments, accounts can be grouped based on the actions that can be performed on the accounts. A variety of processes for determining account actions are described with respect to FIG. 5. In many embodiments, account actions are created for those accounts which are identified as being active and/or in use.

Transfer event actions can be determined (316). For each account, one or more transfer event actions can be specified. Transfer event actions can indicate one or more account actions to be performed with respect to the associated account in the event that a transfer event occurs and/or one or more targets for the account action. In many embodiments, a transfer event action can indicate that an account should be closed when a transfer event occurs. For example, an account can have a monthly subscription fee and, on the occurrence of the transfer event, the account should be cancelled in order to avoid incurring liability for the subscription fee. In a number of embodiments, a transfer event can indicate that an address associated with an account should be changed. For example, an account can be a website hosting account and, on the occurrence of a transfer event, the billing address for the account should be updated so that the fees associated with the website continue to be paid. In several embodiments, a transfer event action can indicate that an account should be transferred to a beneficiary identified in the transfer event action when a transfer event occurs. For example, an account can be an airline rewards account and, on the occurrence of a transfer event, the miles associated with the account can be transferred to a beneficiary. In a variety of embodiments, a transfer event can indicate that the state of an account should be changed when a transfer event occurs. For example, an account can be a social media account and, on occurrence of a transfer event, the social media account can be changed from an active account to a memorial account. In many embodiments, a transfer event action includes transferring one or more files associated with an account. For example, a file storing a digital currency wallet can be transferred from a computing device associated with the user to a computing device associated with a beneficiary and then deleted from the user's computing device. In several embodiments, multiple transfer event actions can be performed for a single account. For example, the balance of a user's checking account can be transferred to a savings account associated with the beneficiary and then the user's checking account can be closed. Transfer event actions can be determined for a group of accounts. For example, a set of accounts can be associated with a group where all the accounts in the group can only be closed. A transfer event action can be associated with the entire group such that, when a transfer event occurs, every account in the group is automatically closed. A number of processes for generating transfer event actions are described with respect to FIG. 6.

Transfer data can be obtained (318). The transfer data can indicate that one or more transfer events have occurred. Transfer events can include, but are not limited to, the death of the owner of an account, the disablement of the owner of an account, a change in power of attorney for the account, an action undertaken by a trust administrator for an account, and the like. The transfer data can be provided electronically and/or manually provided to an asset management system. For example, a paper death certificate can be issued, which can then be scanned and electronically provided to the asset management system.

Transfer events can be initiated (320). In a number of embodiments, transfer events can be initiated when the transfer data is obtained. Initiating a transfer event can include signing into an account, using a username and password associated with the account, and performing one or more account actions for the account as specified in the transfer event actions for the account. In this way, only account actions which are valid for the account can be performed and the account actions can be automatically performed. In a variety of embodiments, performing an account action can require additional information and that information can be automatically provided when the transfer event is initiated. For example, a financial account can require proof of death to initiate an account transfer to a beneficiary. The transfer data, such as the death certificate, can be automatically provided to the account system providing the financial account to satisfy the requirements to perform the account transfer. In many embodiments, initiating a transfer event includes generating a cryptographic hash including a previous block, a timestamp, and transfer data indicating the transfer event. The cryptographic has can be recorded on a distributed ledger. In this way, transfer events can be automatically initiated and/or recorded on a blockchain. For example, digital currency can be automatically transferred by preparing a transaction transferring, via an account system providing a digital currency transfer service, the balance of the user's digital currency wallet to the beneficiary's digital currency wallet when a transfer event occurs. In several embodiments, usernames and/or passwords can be provided to the beneficiary when the transfer event is initiated. For example, a beneficiary can receive the username and password for the user's social media account when the transfer event is initiated along with a set of instructions directing the beneficiary to maintain the user's social media account. In a number of embodiments, initiating the transfer event includes providing a username and/or password for a password manager to a beneficiary. In this way, a beneficiary can manage one or more of the accounts and/or the transfer events defined for the accounts.

Determining Related Accounts

Figure 4:
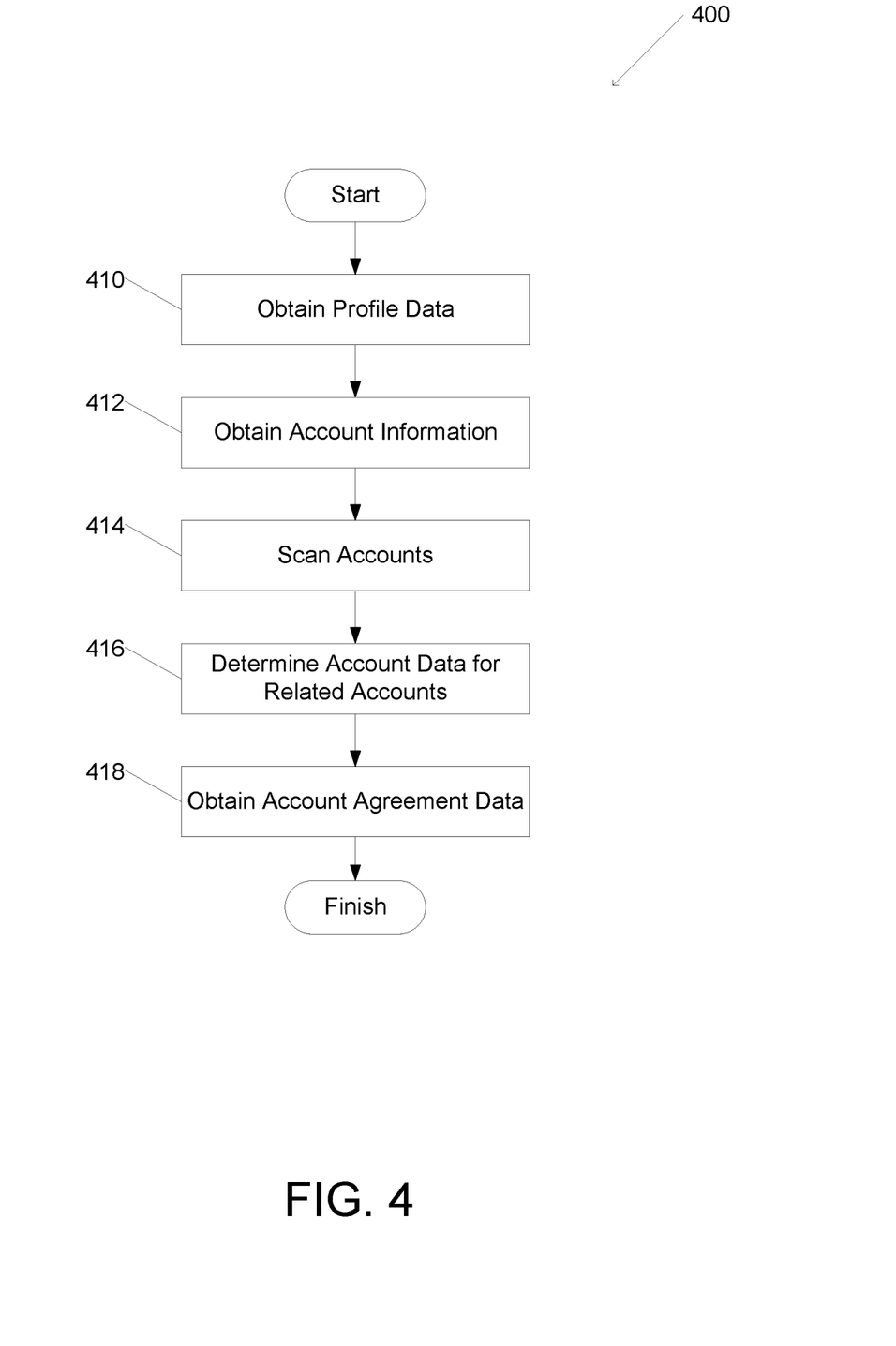
FIG. 4 is a flow chart illustrating a process for determining related accounts in accordance with embodiments described herein.

Turning now to FIG. 4, a process for determining related accounts in accordance with aspects described herein is shown. Some or all of the steps of FIG. 4 can be performed by any computing device and/or combination thereof described herein. Some or all of the steps described with respect to FIG. 4, particularly those aspects directed to user data capture, transmission and/or use of personal data, and/or storage of login information, can be performed with permission of the user and/or designated beneficiary.

Process 400 can include obtaining (410) profile data for a user. The profile data can be obtained and/or include any of the data as described herein.

Account information can be obtained (412). The account information can include one or more accounts associated with the user and can be indicated in the profile data. The account information can include one or more email addresses, social media accounts, password manager accounts, digital currency wallets, and/or any other accounts associated with the user that can include references to accounts related to the user. For example, an email account can include registration emails from one or more account systems, while a social media account can include one or more posts from the user indicating an affiliation with a particular account system. The account information can include login information, or any other identifying information such as name, date of birth, address, social security number, and the like, for the accounts so that the accounts can be automatically accessed. In a variety of embodiments, a centralized credential store, such as a password manager, can be used to store credentials for each account. Access to the password manager can be centralized to a single piece of login information.

Accounts can be scanned (414). The accounts can be scanned to identify one or more accounts related to the user. In many embodiments, the user provides explicit permission to scan the accounts. In a variety of embodiments, a user's email account can be scanned to identify one or more emails associated with related accounts. Metadata found in an email header can be parsed to determine source information for each email correspondence in the user's email account. The parsed metadata can include a domain name identifying the source of the email. The domain names can be compared to a database mapping domain names to particular account systems to determine if an email identifies a potential account related to the user. In a variety of embodiments, a password manager can be scanned to identify a set of domain names based on the login information stored in the password manager database.

In several embodiments, the subject and/or body of an email can be scanned to identify one or more keywords indicating that the email is associated with the creation of an account. For example, a welcome email can include phrases such as "welcome," "thank you," "username," "sign in," "subscribe," "unsubscribe," and the like. In a variety of embodiments, one or more posts made to a social media account can be scanned to identify a relationship between the user and an account system. For example, a post to the user's social media account can be scanned to identify the poster of the message, one or more social media accounts referenced in the post, and/or the sentiment of the post. In many embodiments, references to social media counts by scanning for particular tags or key symbols, such as "#" or "@" to indicate a reference to an account system and/or a social media account associated with the account system. The sentiment of a post can use a variety of natural language processing techniques to determine a context for the post with respect to a variety of topics, brands, and/or themes. Sentiment is typically positive or negative and can be expressed as a binary flag, a sentiment score, and/or the like. When a user expresses positive sentiment for a particular account system, this can be an indication that the user has one or more accounts provided by the account system.

Account data for related accounts can be determined (416). The related accounts can be determined based on the account systems identified by scanning the user's accounts. The list of potential related accounts can be verified by the user, the profile data, and/or other gathered information regarding the consumer. In a variety of embodiments, a machine classifier can be used to generate a feature vector indicating a particular account system and a probabilistic likelihood that the user has one or more accounts associated with the particular account system. The machine classifier can generate the feature vector based on data obtained from scanning (414) the accounts, such as keywords, domain names, and the like. Any of a variety of machine classifiers, such linear classifiers, naive Bayes classifiers, support vector machines, decision trees, boosted trees, random forests, neural networks, hidden Markov models, and/or combinations of machine classifiers can be utilized. In several embodiments, machine classifiers can be trained using a set of training data including welcome emails and/or domain names from a variety of account systems. In a variety of embodiments, the scanned data can be processed using one or more pattern recognition algorithms that search for various words, phrases, or other identifiable criteria. For example, a pattern recognition algorithm can search for the word unsubscribe in an email correspondence indicating that the email correspondence is associated with an existing user account.

Account agreement data can be obtained (418). Account agreement data can indicate one or more aspects of the account, such as the ability to transfer the account to a third party, subscription fees for the account, fees associated with a transfer, a cash value of the account, and the like. The account agreement data can include user agreements, terms and conditions, privacy policies, and the like. The account agreement data can be obtained from the scanned accounts. For example, an email can include an attachment providing a copy of the account agreement data for the account. The account agreement data can be obtained from an account system providing the account. For example, the account can be accessed by providing a username and password to the account system, which provides access to the account where a copy of the account agreement data can be downloaded. In many embodiments, the username and/or password are provided using a password manager. In several embodiments, the account agreement data is manually uploaded to an asset management system. For example, an asset management system can provide a listing of related accounts presented via a user interface that allows for account information, such as usernames, passwords, and account agreement data, to be uploaded and associated with the related accounts. In a variety of embodiments, accounts can be classified and/or grouped based on the account agreement data as described in more detail herein. In many embodiments, the type of an account (e.g. financial account, social media account, etc.) can be determined based on the account agreement data. For example, the account agreement data can include standardized language, such as federally mandated disclosures, which can be compared to a database mapping standardized terms to account types. The terms indicated in the account agreement data can be used to query the database and identify the type of account.

Determining Account Actions

Figure 5:
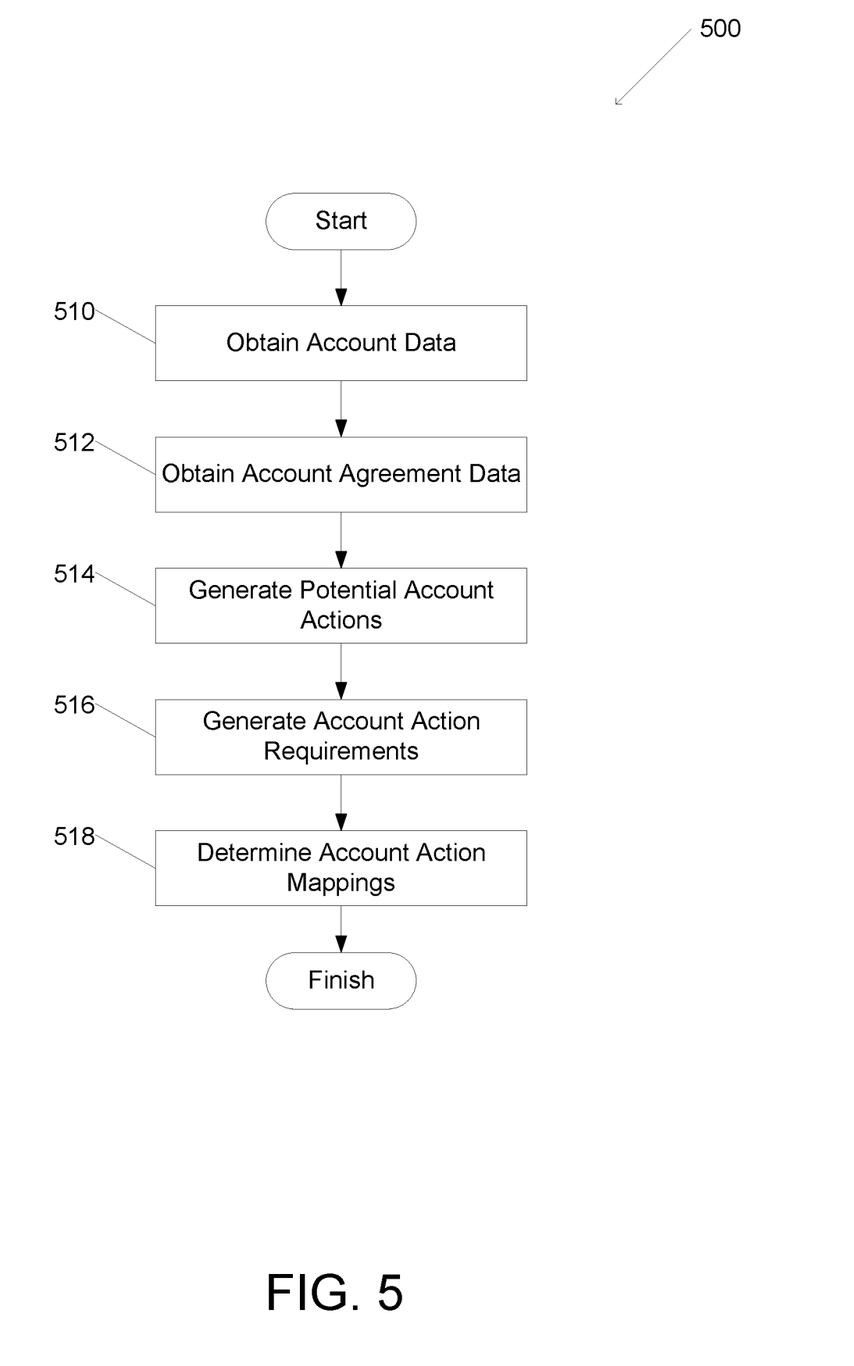
FIG. 5 is a flow chart illustrating a process for determining account actions in accordance with embodiments described herein.

Turning now to FIG. 5, a process for determining account actions in accordance with one or more arrangements described herein is shown. Some or all of the steps of FIG. 5 can be performed by any computing device and/or combination thereof described herein. Some or all of the steps described with respect to FIG. 5, particularly those aspects directed to user data capture, transmission and/or use of personal data, and/or storage of login information, can be performed with permission of the user and/or designated beneficiary.

Process 500 can include obtaining (510) account data. The account data can be for related accounts and be obtained and/or include any of the data as described herein. Account agreement data can be obtained (512). The account agreement data can be associated with the obtained account data and be obtained and/or include any of the data as described herein.

Potential account actions can be generated (514). Potential account actions can be determined based on account agreement data for a particular account. Account actions can include, but are not limited to, transferring the account to a third party, closing the account, setting a beneficiary for an account, modifying the address associated with an account, redeeming rewards associated with an account, transferring data associated with an account, and any other actions including those described herein. In a variety of embodiments, a machine classifier can be used to generate a feature vector indicating one or more account actions and a probabilistic likelihood that the account allows for a particular action to be performed. Any of a variety of machine classifiers and/or combinations of machine classifiers as described herein can be utilized to identify potential account actions. In several embodiments, machine classifiers can be trained using a set of training data including a set of account agreement data and a corresponding set of account actions for each piece of account agreement data. In a variety of embodiments, the account agreement data can be processed using one or more pattern recognition algorithms that search for various words, phrases, or other identifiable criteria in the account agreement data. For example, a pattern recognition algorithm can search for the phrase "closing your account" in the account agreement data indicating that a particular portion of the account agreement data provides an indication that the account can (or cannot) be closed and/or the necessary steps to close the account. In many embodiments, accounts can be grouped based on the potential actions that can be taken with respect to the accounts. For example, accounts which allow a transfer of control of the account from one party to another can be grouped as "transferrable accounts," while accounts which can only be closed can be grouped as "non-transferrable accounts."

Account action requirements can be generated (516). Requirements to perform one or more of the account actions can be generated based on the account agreement data. Account action requirements can include, but are not limited to, providing the identity of a beneficiary, providing an updated address, providing proof of death, providing a legal authorization to perform a particular action, payment of a termination fee, and/or the like. In a variety of embodiments, a machine classifier can be used to generate a feature vector based on the account agreement data and indicating one or more account action requirements and a probabilistic likelihood that a particular requirement is associated with a particular account action. Any of a variety of machine classifiers and/or combinations of machine classifiers as described herein can be utilized to identify account action requirements. In several embodiments, machine classifiers can be trained using a set of training data including a set of account actions and a corresponding set of terms identifying the requirements associated with performing the account action. In a variety of embodiments, the account agreement data can be processed using one or more pattern recognition algorithms that search for various words, phrases, or other identifiable criteria in the account agreement data. For example, a pattern recognition algorithm can search for the phrase "providing a beneficiary contact" under a "transferring your account" section in the account agreement data that the account agreement data requires that beneficiary information be provided to transfer the associated account. In a variety of embodiments, accounts can be grouped based on the required data to perform a particular action. For example, accounts that require beneficiary identification can be grouped as "beneficiary identification required."

Account action mappings can be determined (518). Account action mappings can include a mapping of a particular account action to a particular account. In many embodiments, account action mappings can be determined by providing a user interface providing a listing of accounts and, for each account, a second listing of account actions which can be performed with respect to the account. The user interface can also allow for the identification of particular requirements for a particular account action and/or allow information to be provided to satisfy the requirements. For example, an account transfer action can be provided for an account along with the name and address of the beneficiary of the account transfer action. In a number of embodiments, account actions can be mapped to a group of accounts. In this way, the same account action can be quickly and easily mapped to multiple accounts.

Determining Transfer Events

Figure 6:
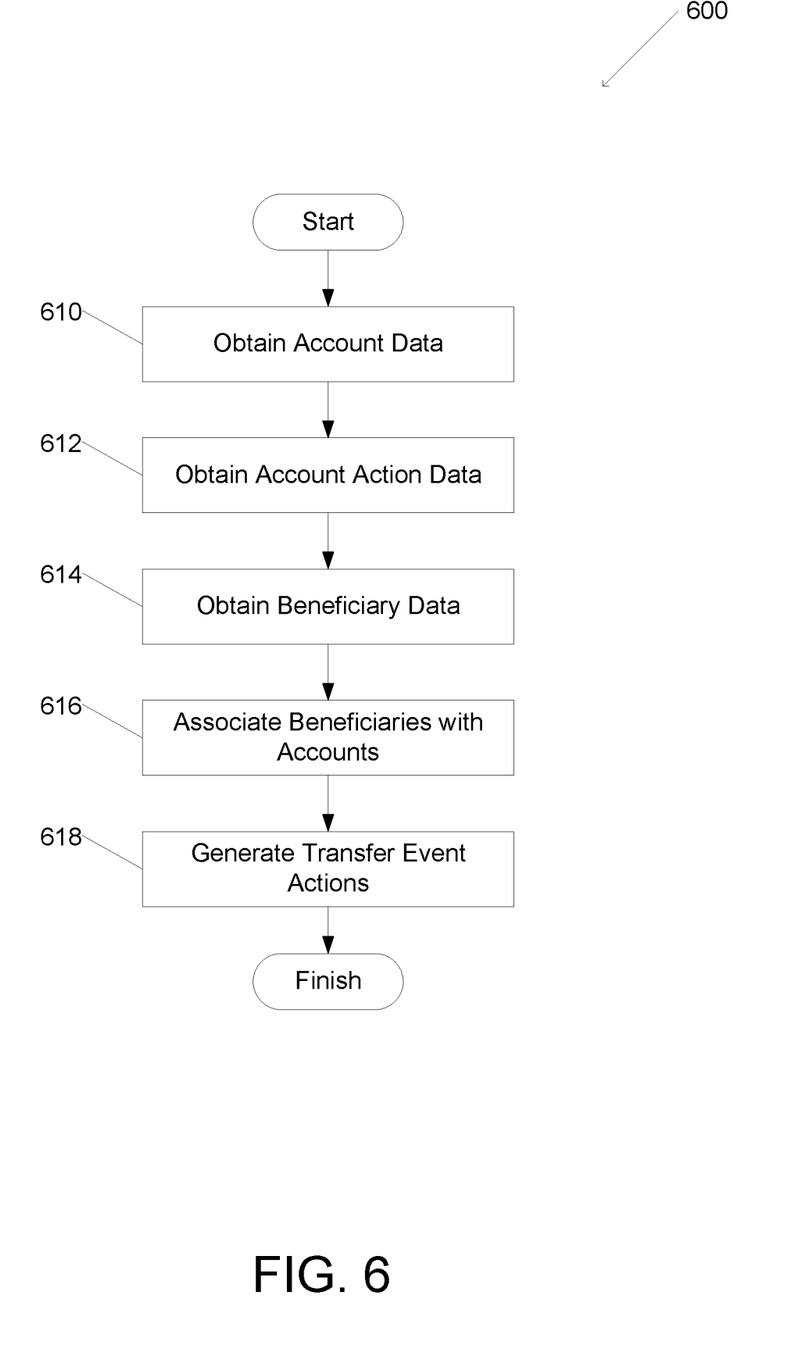
FIG. 6 is a flow chart illustrating a process for determining transfer event actions in accordance with embodiments described herein.

Turning now to FIG. 6, a process for determining transfer events in accordance with one or more arrangements described herein is shown. Some or all of the steps of FIG. 6 can be performed by any computing device and/or combination thereof described herein. Some or all of the steps described with respect to FIG. 6, particularly those aspects directed to user data capture, transmission and/or use of personal data, and/or storage of login information, can be performed with permission of the user and/or designated beneficiary.

Process 600 can include obtaining (610) account data. The account data can be for related accounts and be obtained and/or include any of the data as described herein. Account action data can be obtained (612). The account action data can be associated with the obtained account data and be obtained and/or include any of the data as described herein.

Beneficiary data can be obtained (614). The beneficiary data can include any information regarding a beneficiary, such as a name, address, social security number, telephone number, age, driver's license number, credit card or bank information, insurance policies, email address, social media accounts, and/or the like. The beneficiary information can be manually provided, such as via a user interface, and/or automatically determined by processing one or more accounts associated with the user as described in more detail herein. In a variety of embodiments, the beneficiary data can be used to generate a beneficiary profile used within an asset management system.

Beneficiaries can be associated (616) with accounts. One or more beneficiaries can be associated with a particular account. In a variety of embodiments, the beneficiary is designated to receive an entitlement from the associated account. For example, a financial account can have two beneficiaries that are each designated to receive one half of the value of the financial account. In several embodiments, the beneficiary is designated to receive control of the account. For example, the credentials (e.g. username and password) for a social media account can be emailed to a beneficiary so that the beneficiary can log in and manage the social media account. In a number of embodiments, the beneficiary can be designated to assume payment for the account. For example, a beneficiary of a media streaming account can be assigned payment responsibility to keep the media streaming account active.

Transfer event actions can be generated (618). A transfer event action can specify an account, one or more account actions, one or more beneficiaries for each account action, and one or more transfer events. Transfer event actions can be generated for a single account and/or a group of accounts. In this way, a particular set of actions can be performed on an account or group of accounts, with assets transferred to one or more beneficiaries as appropriate, when one or more events occur. For example, an account can be transferred to a beneficiary when proof of death of the owner of the account is provided. In many embodiments, multiple transfer events can be associated with a transfer event action. The multiple events can be inclusive (e.g. each event must occur before the transfer event action is triggered) or exclusive (e.g. one of the specified events must occur before the transfer event action is triggered). In many embodiments, one or more usernames and/or passwords can be indicated to be sent to a beneficiary so that the beneficiary can access the account. In several embodiments, the beneficiary is provided with a master username and password for a password manager having access to one or more accounts designated for the beneficiary. The transfer event action can include automatically creating a password manager for the beneficiary to facilitate the secure transfer of accounts. In this way, the usernames and/or passwords for the accounts can be automatically changed prior to transferring the accounts to the beneficiary. This can limit the likelihood that the accounts designated for the beneficiary are compromised and/or potentially able to be accessed by someone other than the beneficiary.

Various aspects described herein can be embodied as a method, an apparatus, or as one or more computer-readable media storing computer-executable instructions. Accordingly, those aspects can take the form of an entirely hardware embodiment, an entirely software embodiment, or an embodiment combining software and hardware aspects. Any and/or all of the method steps described herein can be embodied in computer-executable instructions stored on a computer-readable medium, such as a non-transitory computer readable medium. Any and/or all of the method steps described herein can be embodied in computer-readable instructions stored in the memory of an apparatus that includes one or more processors, such that the apparatus is caused to perform such method steps when the one or more processors execute the computer-readable instructions. In addition, various signals representing data or events as described herein can be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures can be performed in other than the recited order, and that one or more steps illustrated can be optional in accordance with aspects of the disclosure. Further, one or more aspects described with respect to one figure or arrangement can be used in conjunction with other aspects associated with another figure or portion of the description.

What is claimed is:

1. A computer-implemented method comprising:
   obtaining profile data indicating at least one first account associated with a user;
   scanning, via a computer implemented system, the at least one first account to identify at least one potential second account related to the user, based at least in part on a pattern-recognition algorithm utilizing defined criteria for identification of potential second accounts related to the user based on scan of the first user account and indicating a probabilistic likelihood that the user has the at least one second account, wherein the probabilistic likelihood is derived from scanning a body of an email, as part of scanning the first account, to identify at least one keyword associated with a creation of a second account determined at least in part based on one or more keywords identified in the scanning;
   identifying an account system indicated in the at least one potential second account, wherein the account system manages the at least one potential second account;
   determining the at least one potential second account indicates login information for the account system;
   verifying, based on the login information, the at least one potential second account corresponds to the user;
   adding, based on the verifying, the at least one potential second account to a set of second accounts related to the user;
   determining a set of account actions for each second account in the set of second accounts;
   determining a set of transfer event actions for each second account in the set of second accounts;
   obtaining transfer data indicating an event has occurred with respect to the user; and
   when the event indicated in the transfer data corresponds to a transfer event indicated in a transfer event action in the set of transfer event actions, transmitting an indication to the account system to initiate the transfer event action.

2. The computer-implemented method of claim 1, wherein the scanning the at least one first account comprises scanning a header of an email to identify a domain name associated with the email.

3. The computer-implemented method of claim 1, wherein the probabilistic likelihood is derived from scanning a body of an email, as part of scanning the first account, to identify at least one keyword associated with a creation of a second account determined at least in part based on one or more keywords identified in the scanning.

4. The computer-implemented method of claim 1, wherein the determining the set of account actions further comprises:
   obtaining account agreement data for at least one of the second accounts; and
   processing the account agreement data to identify the set of account action for the at least one second account.

5. The computer-implemented method of claim 4, wherein processing the account agreement data further comprises generating a set of account action requirements for each account action in the set of account actions for the at least one second account.

6. The computer-implemented method of claim 1, wherein the transfer data comprises a death certificate.

7. A system comprising:
   a processor, and
   a memory in communication with the processor, the memory including instructions that, when executed by the processor, cause the processor to:
   obtain profile data indicating at least one first account associated with a user;
   scan the at least one first account to identify at least one potential second account related to the user, based at least in part on a pattern-recognition algorithm utilizing defined criteria for identification of potential second accounts related to the user based on scan of the first user account and indicating a probabilistic likelihood that the user has the at least one second account, wherein the probabilistic likelihood is derived from scanning a body of an email, as part of scanning the first account, to identify at least one keyword associated with a creation of a second account determined at least in part based on one or more keywords identified in the scanning;
   identify an account system indicated in the at least one potential second account, wherein the account system manages the at least one potential second account;
   verify, based on the login information, the at least one potential second account corresponds to the user; and
   add, based on the verifying, the at least one potential second account to a set of second accounts related to the user;
   determine a set of account actions for each second account in the set of second accounts;
   determine a set of transfer event actions for each second account in the set of second accounts, wherein a transfer event action indicates a transfer event and is performed by the account system;
   obtain transfer data indicating an event has occurred with respect to the user; and
   when the event indicated in the transfer data corresponds to a transfer event indicated in a transfer event action in the set of transfer event actions, transmit an indication to the account system to initiate the transfer event action.

8. The system of claim 7, wherein the instructions that, when executed by the processor, further cause the system to scan the at least one first account by scanning an email header to identify a domain name associated with the email.

9. The system of claim 7, wherein the probabilistic likelihood is derived from scanning a body of an email, as part of scanning the first account, to identify at least one keyword associated with a creation of a second account determined at least in part based on one or more keywords identified in the scanning.

10. The system of claim 7, wherein the instructions that, when executed by the processor, further cause the system to determine the set of account actions for at least one second account in the set of second accounts by:
    obtaining account agreement data for the second account; and
    processing the account agreement data to identify the set of account actions for the second account.

11. The system of claim 10, wherein the instructions that, when executed by the processor, further cause the system to process the account agreement data by generating a set of account action requirements for each account action in the set of account actions for the at least one second account.

12. The system of claim 7, wherein the transfer data comprises a death certificate.

13. A non-transitory computer-readable medium storing instructions for controlling a processor, the instructions causing the processor to perform steps comprising:

obtaining profile data indicating at least one first account associated with a user;

scanning, via the processor, the at least one first account to identify at least one potential related account of the user, based at least in part on a pattern-recognition algorithm utilizing defined criteria for identification of potential second accounts related to the user based on scan of the first user account and indicating a probabilistic likelihood that the user has the at least one second account, wherein the probabilistic likelihood is derived from scanning a body of an email, as part of scanning the first account, to identify at least one keyword associated with a creation of a second account determined at least in part based on one or more keywords identified in the scanning;

identifying an account system indicated in the at least one potential second account, wherein the account system manages the at least one potential second account;

determining the at least one potential second account indicates login information for the account system;

verifying based on the login information, the at least one potential second account corresponds to the user; and adding, based on the verifying, the at least one potential second account to a set of second accounts;

determining a set of account actions for each second account m the set of second accounts;

determining a set of transfer event actions for each second account in the set of second accounts, wherein a transfer event action indicates a transfer and is performed by the account system;

obtaining transfer data indicating an event has occurred with respect to the user; and when the event indicated in the transfer data corresponds to a transfer event indicated in a transfer event action in the set of transfer event actions, transmitting an indication to the account system to initiate the transfer event action.

14. The non-transitory computer-readable medium of claim 13, wherein the processor further performs steps comprising scanning an email header of an email in the first account to identify a domain name associated with the email.

15. The non-transitory computer-readable medium of claim 13, wherein the processor further performs steps comprising:

obtaining account agreement data for at least one second account in the set of second accounts; and processing the account agreement data to identify the set of account actions for the at least one second account.

16. The non-transitory computer-readable medium of claim 15, wherein the processor further performs steps comprising generating a set of account action requirements for each account action in the set of account actions for the at least one second account.

* * * * *

UNITED STATES PATENT AND TRADEMARK OFFICE
CERTIFICATE OF CORRECTION

| | |
|---|---|
| PATENT NO. | : 11,348,170 B2 |
| APPLICATION NO. | : 16/365290 |
| DATED | : May 31, 2022 |
| INVENTOR(S) | : Philip Peter Ramirez et al. |

It is certified that error appears in the above-identified patent and that said Letters Patent is hereby corrected as shown below:

In the Claims

Column 15, Lines 24-25, Claim 13:
After "account actions for each second account"
Delete "m"
Insert --in--.

Signed and Sealed this
Eighteenth Day of April, 2023

*Katherine Kelly Vidal*

Katherine Kelly Vidal
*Director of the United States Patent and Trademark Office*